Dec. 15, 1942.   V. C. HODGES   2,305,256
GENERATOR CONTROL
Filed April 7, 1941
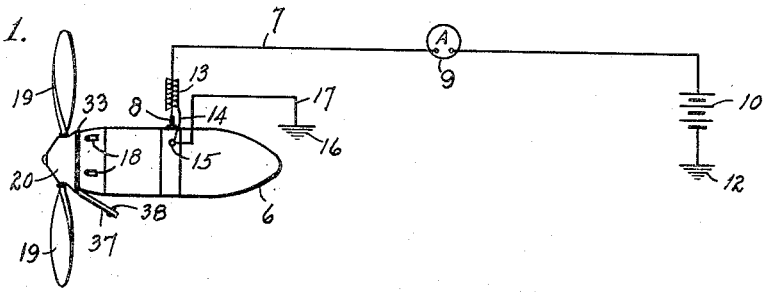
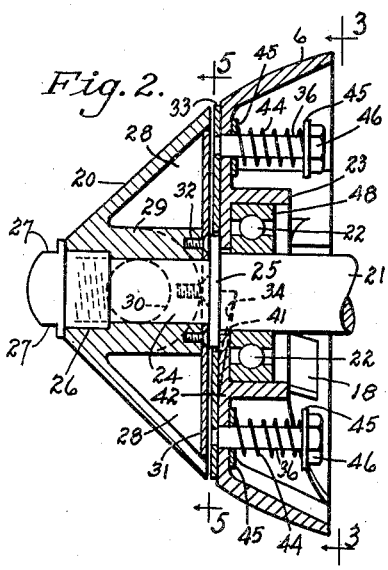
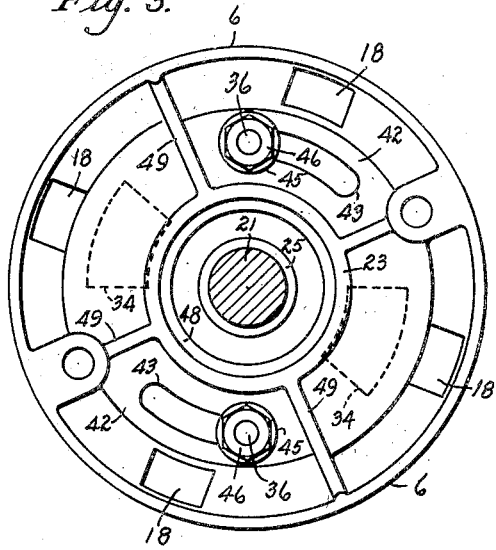
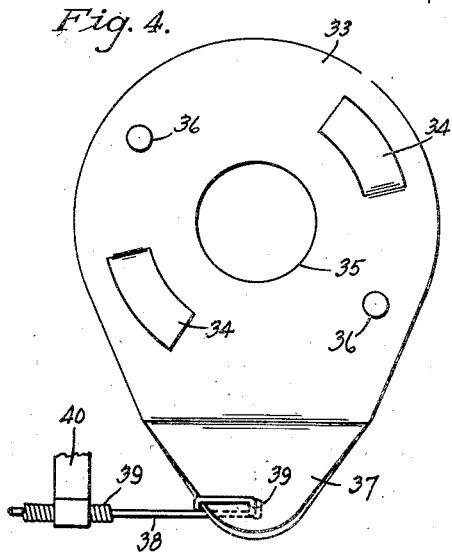
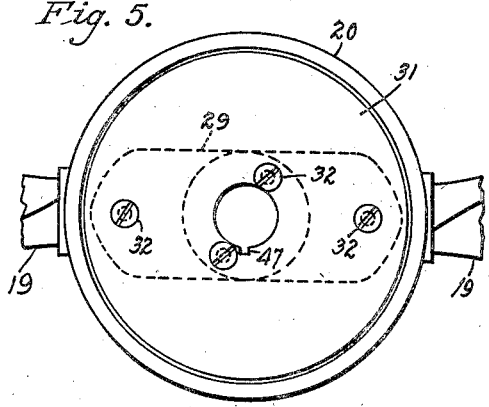
INVENTOR.
V. C. Hodges
BY Carlos G. Stratton
ATTORNEY Patented Dec. 15, 1942

2,305,256

UNITED STATES PATENT OFFICE 2,305,256

GENERATOR CONTROL

Vera C. Hodges, Los Angeles, Calif., assignor to Champion Aviation Products Company, Los Angeles, Calif., a copartnership consisting of H. P. Lester, Thomas B. Smallwood, and Vera C. Hodges Application April 7, 1941, Serial No. 387,178

4 Claims. (Cl. 188—71)

My invention relates to a generator control, and more particularly to a manual, mechanical control for a generator.

An important object of the invention is to provide manual, mechanical means for stopping and releasing a propeller-driven generator for an aeroplane.

Another object of the invention is to provide non-electrical means for temporarily stopping the generator, in order to avoid interference with a radio and other means.

The invention also has for its objects to provide such a control that is positive in operation, convenient in use, of improved structure, easily installed in a working position or disconnected therefrom, economical of manufacture, relative simplicity, and general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is an elevation of a generator to which my control has been applied, and diagrammatically showing an electric circuit connected with same.

Fig. 2 is an enlarged longitudinal section through an embodiment of my invention.

Fig. 3 is a section taken on the line 3—3 of Fig. 2, but showing the ball bearings and the inner race removed.

Fig. 4 is a face view of an element of the mechanical brake, with the actuating means therefor broken away.

Fig. 5 is an elevation of the propeller hub, looking in the direction of the arrows 5—5 of Fig. 2.

Referring more in detail to the drawing, the reference numeral 6 generally designates a generator housing for a generator, whose construction is well known to those skilled in the art. Detailed showing and description of the generator is, therefore, not included herein. A shielded wire 7 connects an insulated post 8 on the generator with an ammeter 9, which in turn is connected with the positive side of a battery 10. The battery is grounded, as indicated at 12.

The shielding 13 of the wire 7 is connected by means of a wire 14 to a ground post 15, whose ground and connection therewith are respectively shown at 16 and 17. The generator 6 has air cooling openings 18.

Propellers 19 are mounted on a hub 20 at the forward end of the generator housing 6. The main shaft 21 of the generator is mounted in the housing 6 through the intermediary of ball bearings 22. A recessed element 23 supports the outer race 48 for the bearings 22. A reduced threaded end 24 of the shaft 21 carries the propeller hub 20. An integral collar 25 is arranged on the shaft between the main portion 21 and the reduced end portion 24. A nut 26 is screwed on the threaded end of the shaft portion 24. Flat sides 27 on the nut 26 provide gripping means for a wrench or other suitable tool, to manipulate the nut 26.

The hub 20 has open spaces 28 to lighten same, but transversely of the hub 20 is a brace 29 which is tapped at 30, at opposite sides, into which threaded inner ends of the propeller blades 19 are screwed. A face plate 31 covers the openings 28 and the brace member 29 of the hub 20. Screws 32 fasten the face plate 31 in its inner faced position on the hub 20.

Arranged between the relatively stationary generator housing 6, and the rotary propeller hub 20, is a brake plate 33. Integral, inclined cam faces 34 are arranged diametrically opposite each other on the brake plate 33. The brake plate has a central opening 35 that rotates upon the collar 25 on the shaft. Bolts 36 are also arranged diametrically opposite each other on the brake plate 33, in between the cam members 34. A bent lug 37 on the brake plate 33 is bent rearward to prevent contact by the propeller blades 19, as best shown in Fig. 1. A flexible control rod 38 is looped through an opening 39 in the lug 37 for rotatably adjusting and holding the brake plate 33. A coiled, flexible sleeve 39 supports the rod 38. The end of the rod 38 that is not shown is arranged accessible to a pilot of the plane, in the cabin thereof. Suitable means 40 is arranged to support the sleeve 39.

Recesses 41 that are inclined similarly to the faces of the cam members 34 are arragned in the end member 42 of the generator housing 6.

The bolts 36 project through slots 43 in the head 42 of the housing 6. Coiled springs 44 are arranged between washers 45 on the bolts 36. Nuts 46 are screwed upon the threaded ends of the bolts 36, to tighten the coiled springs 44 in place. By reason of the fixed mounting of the bolts 36 upon the brake plate 33, the brake plate 33 is held as closely to the end member 42 of the generator housing 6, as the cam members 34 will permit. When the cam members 34 are seated within the recesses 41, as suggested by the broken lines in Fig. 2, then the brake plate 33 lies flat against the end member 42 of the generator housing 6, because of the springs 44. These springs retard any tendency of the brake plate to move away from the generator housing to thereby prevent the brake plate 33 from dragging against the face plate 31 of the propeller hub, and serve to normally hold the cam members 34 fully seated within the recesses 41.

In the operation of my present device, the generator housing 6 and its contained generator are suitably mounted upon a steel strut of an aeroplane. The pitch of the propeller blades 19 determines the speed that the generator is driven, although it is believed clear without further illustration and description that the speed of the generator may be changed by setting the blades flatter toward the wind, and the speed may be reduced by turning the propeller blades more edgewise into the wind. Moreover, it is believed clear without further illustration that a voltage regulator is included with the generator in the housing 6, and that such regulator includes a relay. This does not increase the capacity of the generator, but protects the battery from becoming overcharged. The voltage regulator controls the output by automatically decreasing the charging rate as the battery approaches a fully charged condition, and the charging rate increases proportionate to the output of the generator when the electrical load (radio, lights, etc.) is turned on.

The propeller blades 19 will, of course, be driven by the wind to rotate the hub 20. Rotation of the hub 20 drives the shaft 21, upon which the hub 20 is keyed. The keyway for mounting the hub upon the reduced end portion 24 of the shaft, is shown at 47. The brake plate 33 is operated manually and, of course, is not brought into use unless it is desired to slow down or stop the operation of the generator.

When it is desired to apply the brake to the propeller hub 20, the rod 38 is pulled manually. This causes the cam members 34 to move up the inclined surfaces in the recesses 41. Thereby, the brake plate 33 is moved against the face plate 31 of the hub. By this means the hub 20 is frictionally prevented from rotating. Of course, by partially applying the brake, the speed of the generator may be manually reduced.

Pulling of the control rod 38 causes rotation of the brake plate 33 about the shaft collar 25. This rotation is permitted by sliding movement of the bolts 36 in the recesses 43. Of course, the brake plate 33 is moved outward, by this rotation, against the face plate 31, by means of the cam members 34, against the action of the springs 44. When the brake plate 33 is manually moved back to its non-braking position, the springs 44 tend to maintain the brake plate against the end member 42 of the housing 6 and tend to maintain the cam members 34 in their recesses 41. Strengthening ribs 49 are arranged in the housing 6.

It is believed clear from the foregoing that the present generator control is operated manually. Therefore, the generator may be turned off, even though something goes wrong with the electrical equipment of the plane. This is of special advantage to prevent the overcharging of the battery, preventing electrical interference with the radio, and many other uses.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a generator, a rotary shaft, a rotary propeller hub having a substantially flat friction surface normal to the axis of said shaft, a rotary friction plate opposite said surface, cam means arranged to move the rotary friction plate into frictional engagement with the friction surface of the propeller hub, upon rotation of the friction plate, spring means normally shifting said plate way from the hub and acting to frictionally retard rotation of the plate, and means connected to rotate the friction plate to cause the cam means to move the plate into frictional engagement with the friction surface of the hub and to hold the plate in rotatably adjusted position.

2. In a generator, a rotary propeller hub having a friction surface, a rotary brake plate element, a generator housing element, cam means on one of the elements and the other element having recess means generally similar to cam means, one of the elements having pin means thereon and the other element having slot means in which the pin means is slidable, the slot means being arranged to direct the rotary movements of the brake plate element, the cam and recess being arranged to move the rotary plate element into frictional engagement with the friction surface of the propeller hub, upon rotation of the rotary plate element, and means connected to rotate said plate element.

3. In a generator, a rotary propeller hub having a friction surface, a generator housing element, a brake plate element rotatably supported between the propeller hub and the housing element, cam means on one of the elements and the other element having recess means generally similar to cam means, the cam and recess being arranged to move the rotary plate element into frictional engagement with the friction surface of the propeller hub, upon rotation of the rotary plate element, spring means tending to move the plate away from said frictionally engaging position and tending to move the cam into the recess when the cam is arranged to enter the recess, and manual means connected to rotate the brake plate element to said frictionally engaging position, against the action of the spring means.

4. In a generator, a stationary housing, a substantially flat end surface, a shaft journaled therein having an end portion projecting beyond said end surface, a propeller including a hub fixed on said shaft end and presenting a friction surface parallel with, and spaced from, said end surface of the housing, a substantially flat brake plate in the space between said surfaces having rotatable and axially shiftable movement, spring means normally holding said plate against the housing and resisting movement of the plate, said housing having cam-shaped recesses in its said end surfaces and said plate having corresponding cam members normally seated in said recesses, and means for rotatably adjusting said plate to thereby cause axial shifting movement thereof into engagement with the friction surface of the propeller hub against the tension of said spring means.

VERA C. HODGES.